Oct. 20, 1953  E. A. NEFF  2,656,183
PARACHUTE APPARATUS
Filed June 16, 1948
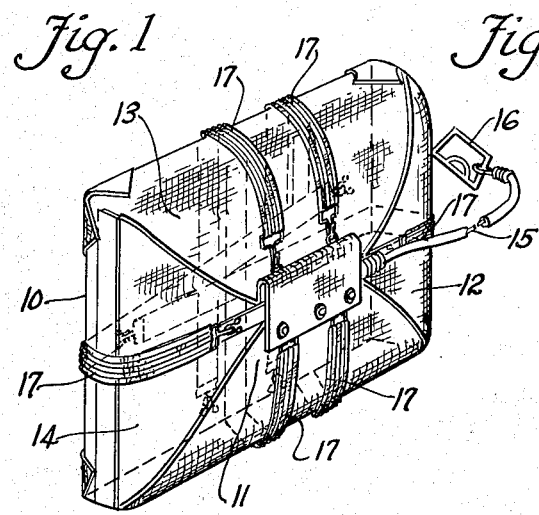
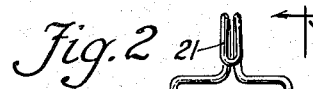
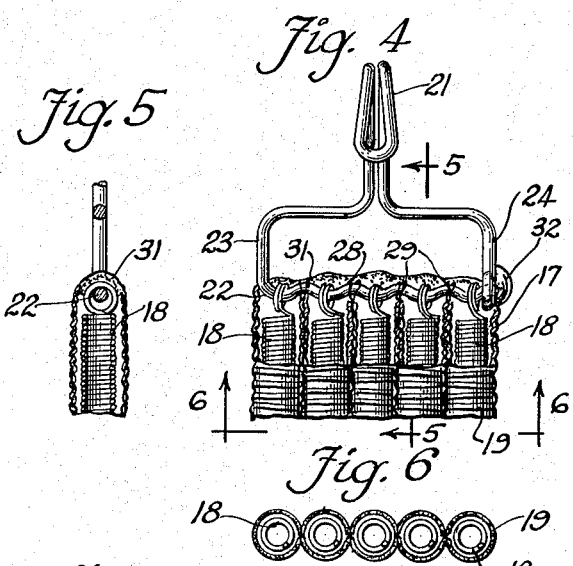
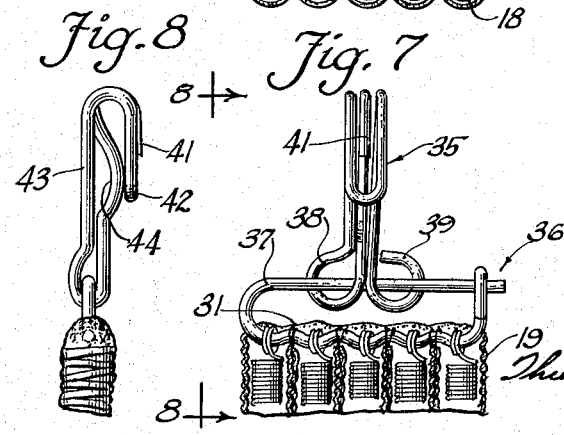
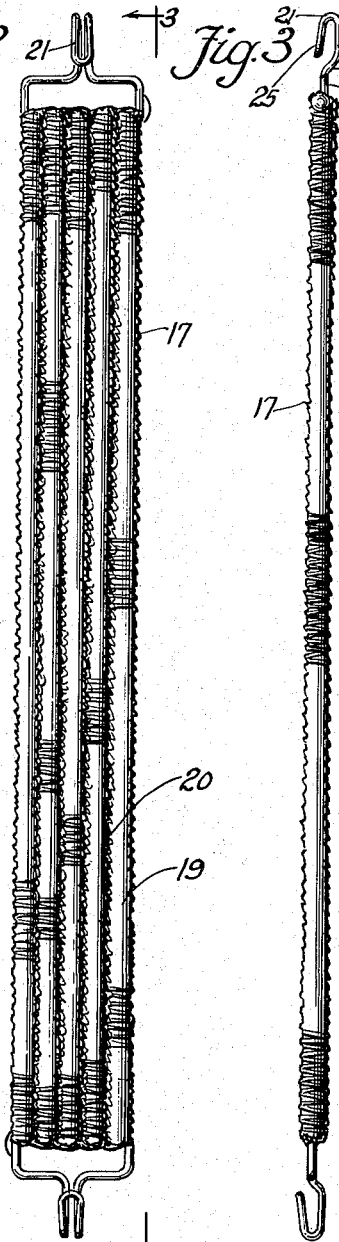
INVENTOR.
Edward A. Neff
BY
Thiess, Olson & Mecklenburger
Attorneys Patented Oct. 20, 1953

2,656,183

UNITED STATES PATENT OFFICE 2,656,183

PARACHUTE APPARATUS

Edward A. Neff, Chicago, Ill.

Application June 16, 1948, Serial No. 33,409

7 Claims. (Cl. 267—73)

This invention relates to parachute containers, more particularly to tension members for opening parachute containers, and it is an object of the invention to provide improved apparatus of this character.

Parachutes, as is well known, are used by flight personnel to lower themselves to the ground whenever it becomes necessary to leave the flying aircraft, and are also used to lower equipment and apparatus of any description to the ground. The need for certainty and assurance of proper operation of the parachute is of course paramount, since the safety of any equipment or the life of any individual being lowered is at stake whenever the parachute is used.

Relatively recent advances in the technical capabilities of aircraft, making it feasible to fly at extremely high altitudes as well as in polar regions where the temperatures are frequently sub-zero, place a greater burden upon the parachute.

Parachutes commonly are carried in a container which may be made of any suitable material, such as canvas, for example, the container having a contour properly designed to hold the parachute and being provided with relatively large opening flaps which, when opened, leave the container widely open so that the parachute may easily come out without hindrance. To open the flaps of the parachute container when the rip cord is pulled, strong elastic tension members are provided.

To assure that such tension members will operate under all conditions of temperature, including the extremely low temperature at high altitudes, one well known tension member is constructed by placing suitable steel springs inside of a protective covering, which, for example, may be made of textile material. The steel springs retaining their elasticity at low temperatures greatly increase the parachute safety features. Hooks are attached at each end of the springs for attaching the tension member to the parachute container. The individual springs are joined to the hook by fastening a textile-like tape or cord to an eye at the end of the springs and then fastening the tape or cord to the hook through a suitable tying or stitching process. This is a relatively cumbersome and expensive proceeding requiring many operations. Accordingly, it is a further object of the invention to provide an improved tension member of the foregoing character for opening parachute containers including an improved arrangement for fastening the springs to the associated hook.

It is a further object of the invention to provide an improved tension member of the foregoing character for opening parachute containers including improved means for positioning the steel springs.

In carrying out the invention in one form, a tension member for opening a parachute container is provided comprising a series of springs, a protective covering therefor, and a hook at each end of the tension member attached to the ends of the springs. Each of the hooks includes a corrugated base for positioning the springs.

For a more complete understanding of the invention, reference should now be had to the accompanying drawings in which:

Figure 1 is a perspective view of a parachute container embodying the invention;

Fig. 2 is an enlarged view of one of the tension members illustrated in Fig. 1;

Fig. 3 is a side view taken substantially in the direction of the arrows 3—3 of Fig. 2;

Fig. 4 is a fragmentary view partially broken away on a somewhat enlarged scale of the tension member.

Fig. 5 is a sectional view taken substantially in the direction of the arrows 5—5 of Fig. 4;

Fig. 6 is a sectional view taken substantially in the direction of the arrows 6—6 of Fig. 4;

Fig. 7 is a fragmentary view similar to Fig. 4 embodying a modified form of the invention, and Fig. 8 is a view taken substantially in the direction of the arrows 8—8 of Fig. 7.

Referring more particularly to the drawing, the invention is shown embodied in parachute apparatus including a parachute container 10, which is adapted to hold a parachute in a well understood manner. The container 10 is of a generally rectangular cross section, may be made of any suitable material, such for example as canvas, and is provided with four relatively large flaps 11, 12, 13 and 14. These flaps are disposed along the sides of the container and when folded toward each other as shown, completely close the container thereby retaining the parachute inside thereof. Associated with container 10, and particularly with flaps 11, 12, 13 and 14 where the flaps come into juxtaposition with each other, is a rip cord 15 to which is attached a ring 16. When the parachute is intended to be opened, the user grips the ring 16 and jerks on it, thereby pulling the rip cord 15 and releasing flaps 11, 12, 13 and 14 so that these may open.

To open flaps 11, 12, 13 and 14, a series of tension members 17 are associated with container 10, one each of the tension members being attached respectively to flaps 11 and 12, and two each being attached respectively to flaps 13 and 14. The tension members are attached to the parachute container as well as to the flaps by means of hooks as shown. In the complete assembly of the parachute container with the parachute inside thereof, flaps 11 and 12, and 13 and 14 are folded into adjoining positions with respect to each other, the flaps being held from moving apart by joining means including the rip cord 15, as is well understood, and therefore not illustrated in more detail in this specification.

In the assembled form, tension members 17 are elongated or stretched out so that a relatively large force is placed upon the various flaps tending to open them, the tension members being elongated by any desired amount, which may approximate 50 percent of their original length, in order to produce the necessary force. Under the tension of the members 17, flaps 11, 12, 13 and 14 open widely, suddenly and with considerable force, when the rip cord 15 is pulled, thereby permitting of no delay when the parachute is to be opened.

Tension members 17, illustrated in greater detail in Figs. 2 to 6 inclusive, embody a series of steel springs 18 enclosed in a protective covering 19 together with hooks 21 attached to the ends of the springs and to the protective covering.

The protective covering 19 may comprise any suitable material such as textile materials or the material available under the trade name of nylon, for example, and is formed into a container or tube providing a separate compartment for each spring by running a series of stitches 20 along the length of the container as shown best in Figs. 2 and 4. Having an individual compartment for each spring prevents the springs from coming into contact with each other within the protective covering, and thus prevents the spring from interfering with each other's operation. When springs 18 are stretched out, it is necessary that the protective covering also increase in length so as not to interfere with the spring operation. To this end the protective covering 19 is gathered into folds or corrugations, as shown, thereby increasing the total length of material placed on the springs. Hence, when the springs are elongated the folds in the covering 19 straighten out and may straighten out to the full length of the material before the elongation is stopped. Preferably, the total length of material may be somewhat greater than the maximum length of the elongated springs, so as not to place unnecessary strain on the covering.

Hooks 21 for attaching the tension members to the parachute container and to which the springs 18, as well as the protective covering 19, are attached comprises a unitary structure including a base 22 and side members 23 and 24 arranged at the extremities thereof. Side members 23 and 24 extend into and are bent together in a reverse loop having two portions 25 and 26. Advantageously, hooks 21 may be made of wire, for example, bent into the configuration shown, the side member 24 being provided with a loop or eye to receive one end of the base 22 (Fig. 4). The portion 26, forming the rear part of the hook, includes a bent portion 27 extending angularly with respect to sides 23 and 24. Hence, the extremity of portion 25 (tip of the hook) lies closer to the angular portion 27 than does the remainder of portion 25. By virtue of angular portion 27, when the hook is to engage a cooperating eye, for example, the portion 25 is sprung apart to allow the cooperating eye to be received between portions 25 and 26. Consequently, the cooperating eye is held between portions 25 and 26 and will not slip out accidentally. However, when force sufficient to cause portion 25 to spring outwardly is exerted, such as when the cooperating eye is forced between angular part 27 and the end of part 25, the hook is opened to allow the cooperating eye to be removed.

The base 22 is formed into a series of corrugations constructed by bending the base into waves or loops so that a depression or trough is formed for each spring. Base 22 is of substantially the same width as the protective covering 19, and the troughs or depressions are so formed as to come into registry with the individual compartments of the protective covering. The end loop of each spring conveniently may be received within the trough or corrugation corresponding to it. Since there are crests 28 between the troughs, the crests register substantially with the stitches forming the individual compartments, thereby preventing the springs from coming into contact with each other, not only along their lengths, but at their ends as well.

The material of protective covering 19 is held to the bases 22 of the hooks partially by means of stitches 29 which stitch the material of the cover together adjacent the spring end loops between crests 28 of the bases. (See Figs. 4 and 5.) In this manner, whenever hooks 21 stretch out the springs, the cover 19 is made to move along with the hooks and hence lengthen out. To prevent the fibers of cover 19 from unravelling and to insure that there are no loose threads which may catch on surrounding objects, a sealing arrangement 31, hard wax for example, may be placed over the spring ends to include both the bases 22 and the adjacent covering material. Also to this end, the ends of bases 22 passing through corresponding eyes on sides 24 of the springs may conveniently be fastened together with globules of solder 32 or the like. This not only attaches these parts to each other, but provides a smooth contour.

To assemble the tension members, springs 18 first may be pushed through the compartments of covering 19, with sufficient additional material being pushed onto the springs and gathered as shown to provide the necessary covering length. Thereafter the base 22 of a hook 21, with the end thereof separated from the side 24, is placed successively through the spring end loops at one end of a tension member so that one loop of each spring lies in a trough of the base. Following this, the exposed end of base 22 is placed through the eye in side 24 and the globule of solder 32 is applied thereto. Thereafter the stitches 29 are applied and the seal 31 is placed over the ends, this being followed by similar operations at the other end of the tension member.

In the modification shown in Figs. 7 and 8, the protective covering 19 and the springs housed thereby are identical with that shown in the preceding figures. However, the hook for attaching the tension member to the parachute container consists of two separable parts 35 and 36. The part 36 is of a generally rectangular configuration having a corrugated base similar to that of base 22 (Fig. 4) and a top portion 37 to which the hook proper 35 is attached. The protective cover 19 is attached to the base of the part 36 by a wax covering 31, or the like, identical with that shown in the preceding figures.

The hook 35 may be a unitary member conveniently formed of wire bent into the configuration shown, having a pair of loops 38 and 39 formed at its lower end and through which top portion 37 of part 36 extends to attach the hook parts together. Loop 39 is formed from one end of the wire forming hook 35, and the other end 41 is bent so as to extend from loop 38 to lie between the parts 42 and 43 which are reversely bent on themselves as shown. The end 41, in continuing to form the loop 38, is provided with a centrally raised portion or hump 44 thereby forming a closed hook. The wire forming the hook being relatively flexible, the hump 44 is resilient in its position and may be deflected away from the members 42 and 43 when it is desired to attach the hook to a cooperating eye. Once the hook has been hooked into a cooperating eye, the hump 44 maintains its position unless sufficient force is exerted to cause the cooperating eye to force the hump 44 downwardly.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A tension member for opening a parachute container comprising a series of extensible and contractible members, a protective covering including an individual compartment for each of said extensible and contractible members, and a hook including a corrugated base and side members at each end of said tension member, each end of said extensible and contractible members being attached to the associated hook at one of the corrugations whereby said extensible and contractible members are separately positioned, said base being attached to one of said sides in a relatively rigid and smooth relationship, loop means securing the free end of said base to the other of said sides, and said protective covering being sealed at each end of said tension member thereby to enclose the corresponding base.

2. In combination, a pair of buckles formed from wire, each of said buckles having a yoke, a hook in said yoke, a waved spring-retaining bar integral with the yoke and extending across one side thereof, a loop formed on the other end of said yoke receiving the outer end of the spring retaining bar, a plurality of spiral springs extending between the buckles, each spring having a loop at each end thereof made of the same material as the spring, each of said loops being centered at the bottom of a wave in the spring retaining bar, each spring being substantially parallel to the adjacent springs.

3. In combination, a pair of buckles formed from wire, each of said buckles having a yoke, a hook in said yoke, a waved spring-retaining bar integral with the yoke and extending across one side thereof, a loop formed on the other end of said yoke receiving the outer end of the spring retaining bar, a plurality of spiral springs extending between the buckles, each spring having a loop at each end thereof made of the same material as the spring, each of said loops being centered at the bottom of a wave in the spring retaining bar, each spring being substantially parallel to the adjacent springs, and a protective cover for said spiral springs.

4. In combination, a pair of buckles formed from wire, each of said buckles having a yoke, a hook in said yoke, a waved spring-retaining bar integral with the yoke and extending across one side thereof, a loop formed on the other end of said yoke receiving the outer end of the spring retaining bar, a plurality of spiral springs extending between the buckles, each spring having a loop at each end thereof made of the same material as the spring, each of said loops being centered at the bottom of a wave in the spring retaining bar, each spring being substantially parallel to the adjacent springs, and a protective cover having an individual compartment for each of said spiral springs.

5. In combination, a pair of buckles formed from wire, each of said buckles having a yoke, a hook in said yoke, a waved spring-retaining bar integral with the yoke and extending across one side thereof, a loop formed on the other end of said yoke receiving the outer end of the spring retaining bar, a plurality of spiral springs extending between the buckles, each spring having a loop at each end thereof made of the same material as the spring, each of said loops being centered at the bottom of a wave in the spring retaining bar, each spring being substantially parallel to the adjacent springs, and a protective cover having an individual compartment for each of said spiral springs, said covering being elongatable whereby to follow extensions and contractions of said springs.

6. In combination, a pair of buckles formed from wire, each of said buckles having a yoke, a hook in said yoke, a waved spring-retaining bar integral with the yoke and extending across one side thereof, a loop formed on the other end of said yoke receiving the outer end of the spring retaining bar, a plurality of spiral springs extending between the buckles, each spring having a loop at each end thereof made of the same material as the spring, each of said loops being centered at the bottom of a wave in the spring retaining bar, each spring being substantially parallel to the adjacent springs, a protective cover having an individual compartment for each of said spiral springs, said covering being elongatable whereby to follow extensions and contractions of said springs, and enclosing means extending over said spring retaining bar and attached to said protective covering.

7. In combination, a pair of buckles formed from wire, each of said buckles having a yoke, a hook in said yoke, a waved spring-retaining bar integral with the yoke and extending across one side thereof, a loop formed on the other end of said yoke receiving the outer end of the spring retaining bar, means for securing said outer end of the spring bar in said loop, a plurality of spiral springs extending between the buckles, each spring having a loop at each end thereof made of the same material as the spring, each of said loops being centered at the bottom of a wave in the spring retaining bar, each spring being substantially parallel to the adjacent springs.

EDWARD A. NEFF.

References Cited in the file of this patent

UNITED STATES PATENTS

| Number | Name | Date |
|---|---|---|
| 400,266 | Stein | Mar. 26, 1889 |
| 2,413,368 | Neff | Dec. 31, 1946 |

FOREIGN PATENTS

| Number | Country | Date |
|---|---|---|
| 5,313 | Great Britain | Mar. 4, 1909 |
| 209,644 | Great Britain | Jan. 17, 1924 |
| 40,590 | Austria | Jan. 25, 1910 |